(12) United States Patent
Abad

(10) Patent No.: US 8,866,906 B1
(45) Date of Patent: Oct. 21, 2014

(54) LAND VEHICLE BASED SURVEILLANCE SYSTEM

(76) Inventor: Cris Abad, Huntington Beach, CA (US)

( * ) Notice: Subject to any disclaimer, the term of this patent is extended or adjusted under 35 U.S.C. 154(b) by 965 days.

(21) Appl. No.: 12/798,281

(22) Filed: Mar. 31, 2010

(51) Int. Cl.
*H04N 7/18* (2006.01)

(52) U.S. Cl.
USPC .......................................... 348/148; 348/143

(58) Field of Classification Search
None
See application file for complete search history.

(56) References Cited

U.S. PATENT DOCUMENTS

| | | | | |
|---|---|---|---|---|
| 7,302,323 | B2 * | 11/2007 | Anderson et al. | 701/32.7 |
| 7,755,668 | B1 * | 7/2010 | Johnston et al. | 348/211.4 |
| 2006/0208169 | A1 * | 9/2006 | Breed et al. | 250/221 |
| 2009/0273673 | A1 * | 11/2009 | Worley et al. | 348/148 |

* cited by examiner

*Primary Examiner* — Umar Cheema
(74) *Attorney, Agent, or Firm* — Dennis W. Beech

(57) ABSTRACT

The present invention is a systems for visual and sound surveillance using a land vehicle with multiple cameras that may have a small pan-tilt-zoom camera profile that may be attached to a roof or ceiling of the land vehicle. The cameras may be positioned in a passenger side front and rear corner, in a driver side position behind a driver seat location, and in a driver side rear corner. A platform with a controller may be in communication with the cameras, and may have a display, a keyboard, a camera position control device, and a recorder.

14 Claims, 2 Drawing Sheets

LAND VEHICLE BASED SURVEILLANCE SYSTEM

BACKGROUND OF THE INVENTION

This invention relates to systems for surveillance in the urban environment and other land location sites that use land vehicles for mobility and for blending with the environment. The new land vehicle surveillance systems may have pan-tilt-zoom cameras with small profiles mounted in optimum field of view and low external detection locations in a land vehicle.

Surveillance systems and vehicles may be known for both land and air vehicles for use by law enforcement agencies and by the military. Land based vehicles may have video and voice detection and recording equipment that may include use of computers for controlling the surveillance equipment. Currently available land vehicle systems may have bulky video cameras mounted on platforms with rotatable mounts to change the field of view for purpose of observation and surveillance. Such systems may often be positioned in the rear portion of sport utility vehicles (SUV), minivans, vans and the like. Due to the size, elevation location, and number of video cameras with video and voice equipment used along with support equipment, for example, supplemental air conditioning and electric power equipment, the rear portion of a vehicle may not allow seating of passengers or surveillance personnel other than in awkward, cramped locations.

Smaller video cameras may be located in the front of a vehicle on a dash board upper surface or a rear view mirror location to monitor for approaching persons at the vehicle front. However, these cameras may have relatively low power video lenses with limited zoom capability in available surveillance land vehicles. Monitor or display equipment and controls such as joy sticks may be located in the rear portion of surveillance vehicles as may be a computer making it difficult or impossible for a vehicle operator or driver to use the system while operating the vehicle. Also, depending on the size of the land vehicle and the surveillance support equipment, it may be difficult for surveillance personnel to operate the equipment while the vehicle is moving.

Currently available land vehicle systems primarily utilize cameras positioned to the rear of the vehicle, limiting the available surveillance field of view to the rear portion of the vehicle, causing the operator to find optimum parking for the vehicle in order to obtain the correct field of view for the subject under surveillance. This is problematic in most urban areas due to limited available parking spaces. Other systems employ a roof mounted periscope type surveillance camera that is more visible to someone external to the vehicle.

SUMMARY OF THE INVENTION

The present invention is directed to systems for visual and sound surveillance using a land vehicle with multiple cameras that may have a small pan-tilt-zoom camera profile that may be attached to a roof or ceiling of the land vehicle. The cameras may be positioned in a passenger side front and rear corner, in a driver side position behind a driver seat location, and in a driver side rear corner. A platform with a controller may be in communication with the cameras, and may have a display, a keyboard, a camera position control device, and a recorder.

These and other features, aspects and advantages of the present invention will become better understood with reference to the following drawings, description and claims.

DETAILED DESCRIPTION

Figure 1:
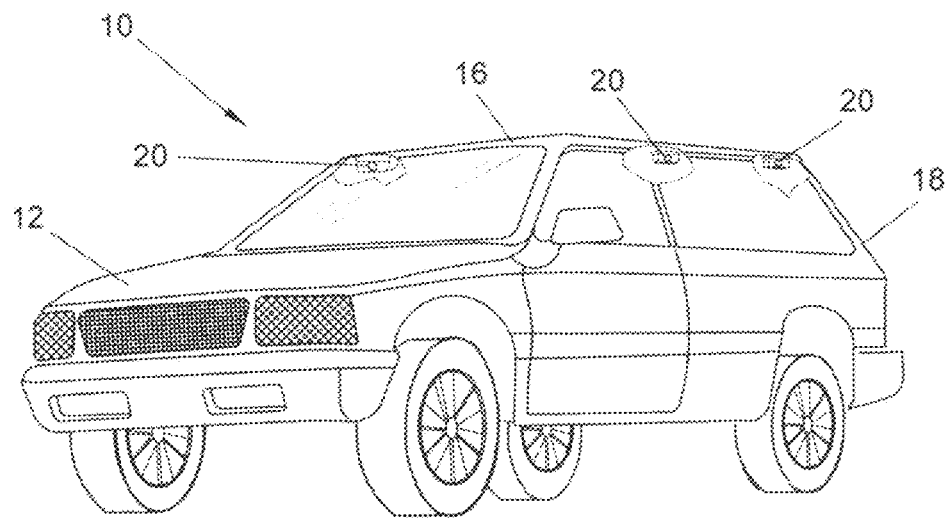
FIG. 1 illustrates a front perspective partial sectional view of a land vehicle with a surveillance system according to an embodiment of the invention.
Figure 2:
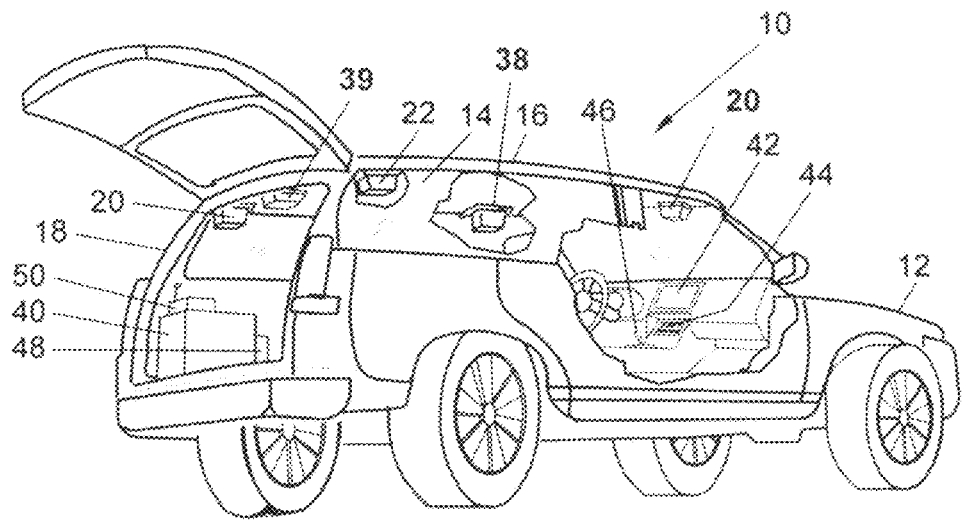
FIG. 2 illustrates a rear perspective partial sectional view of a land vehicle with a surveillance system according to an embodiment of the invention.
Figure 3:
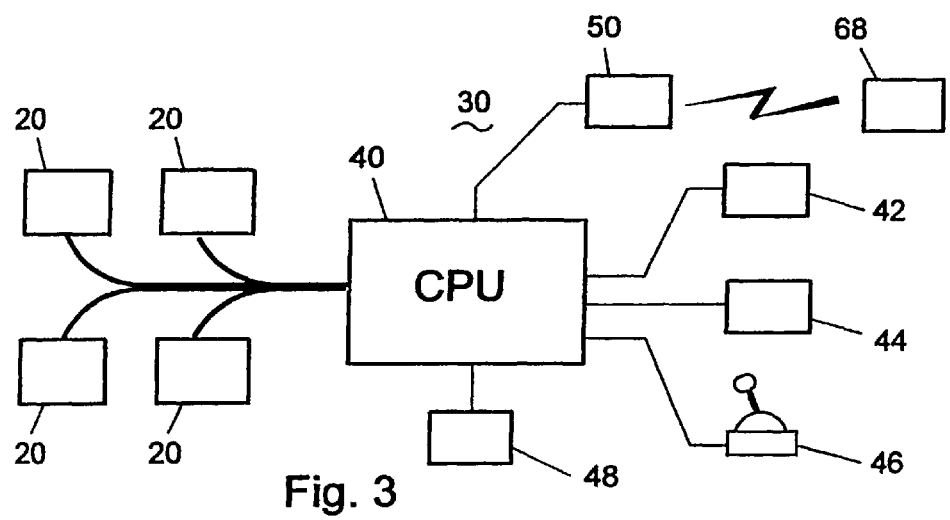
FIG. 3 illustrates a functional schematic diagram of a surveillance system according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 6, a land vehicle based surveillance system 10 may be a modified vehicle 12 such as an SUV with tinted windows 14 to reduce visibility to look from outside to inside the vehicle 12, but to allow good visibility from inside to outside of the vehicle 12. Cameras 20 may be positioned and attached to the roof 16 or ceiling inside overhead structure, pillars or brace structure of the vehicle 12 to allow a reasonable field of view and reduce the probability of detection by someone external to the vehicle 12. The cameras 20 may be of the dome type that may be used in security venues such as banks, casinos and other establishments. Dome type cameras 20 generally have a small profile as compared to the generally rectangular security cameras found on buildings and in surveillance vehicles. The dome type cameras have been developed to have good resolution and large zoom, magnification characteristics as pan-tilt-zoom cameras that are currently available for purchase. The pan-tilt-zoom cameras illustrated in the Figures have a generally flat bottom cover 22 rather than dome or circular covers 22 that may be currently available from camera vendors. This may allow a less visible profile for the cameras 20 mounted in a vehicle.

In a vehicle 12 such as an SUV, cameras 20 may be positioned adjacent the passenger rear corner 32 and the driver side rear corner 34 by mounting the cameras 20 to the roof 16 or roof structure such as beams in the interior of the vehicle 12. These locations may allow visual field of view exterior to each side of the vehicle 12 and to the rear of the vehicle 12. The dome cover 22 of the camera 20 may reduce in the probability of someone outside the vehicle 12 detecting a camera 20 in the vehicle 12. The typical dome camera 20 may allow viewing in a horizontal plane and below such plane when positioned as described. If an elevation above the horizontal plane is desired, a camera 20 may be positioned on one or more of the vehicle 12 generally vertical support members 18.

Figure 4:
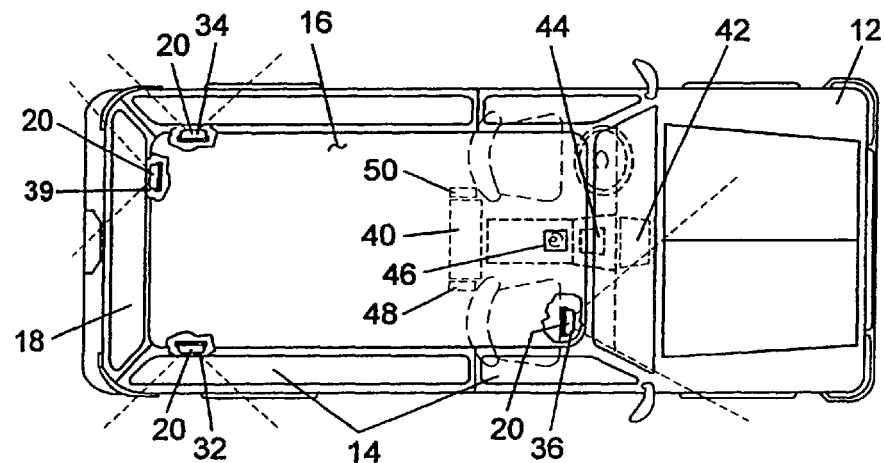
FIG. 4 illustrates a position location diagram of the cameras attached to a roof or ceiling according to an embodiment of the invention.
Figure 5:
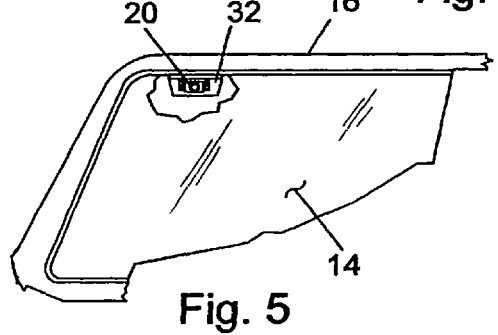
FIG. 5 illustrates an upper rear side portion of a land vehicle and an attached camera according to an embodiment of the invention.
Figure 6:
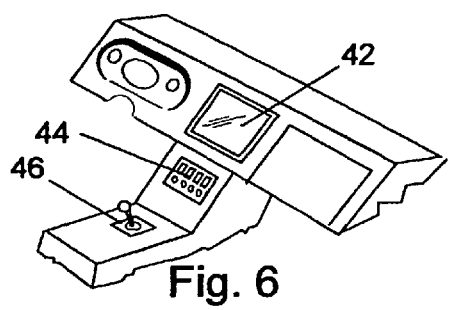
FIG. 6 illustrates a perspective view of a dashboard and console element of a land vehicle with a platform according to an embodiment of the invention.

For additional surveillance field of view, particularly directed toward the front of the vehicle 12, a camera 20 may be positioned adjacent the passenger front corner 36 and behind the driver's head position 38 by attachment to the roof 16 or roof structure such as beams in the interior of the vehicle 12. These positions may allow visual field of view exterior to the front and to each side of the vehicle 12. The position for all four cameras may be selected to cause the least amount of loss of visibility for the driver/operator of the vehicle and the subtending length may minimize detection by a person external to the vehicle 12. The subtending length below the roof inside overhead structure may be less than 1 to 2 inches. A location for four cameras 20 may be at positions 32, 34, 36 and 39 of a vehicle to minimize interference for users of a vehicle 12 and to provide good field of view in a 360 degree sense around the vehicle 12, as best illustrated in FIG. 4. Various additional camera 20 locations may be used depending on the type of vehicle 12 used for surveillance.

The surveillance system may have a controller 40 that may be a computer, a display 42, a keypad or keyboard 44 inputs and a pan-tilt-zoom control 46 or other camera position control device that may be one or more joystick or toggle switch devices. The display 42 may also be a touch screen panel for ease of operation. All of this equipment may be part of the platform 30 for operation of the cameras 20 and other elements of the surveillance system 10. The platform 30 may include a video and sound recorder 48 that may be a duplex or triplex DVR recorder that may be magnetic or light recording disk system.

The system platform 30 elements may be positioned for ease of use by a vehicle operator, for example, in dashboard and console locations adjacent to a driver. This may be important for dynamic surveillance wherein an assigned driver operates a mobile dynamic vehicle (MSV) to follow moving subjects of interest. This type of vehicle with selected variations may also serve as a static surveillance system or dedicated surveillance vehicle (DSV) that may be manned for fixed site surveillance.

The platform 30 may also have an internet communication interface 50 that may be wired or wireless to allow remote control of the surveillance system 10 either in a static or dynamic mode as a remote controlled surveillance vehicle (RCSV) or drone. Other communication interface systems may also be used for remote control. The platform 30 elements for control may also be positioned and connected in the vehicle to allow ease of removal and use as the remote control for camera control and recording. Alternatively, the platform 30 may be controllable by a portable control and communication device 68.

Additional elements that may be integrated into a surveillance vehicle 10 based on surveillance requirements may include: additional cameras 20; power sources 52 such as generators, solar panels, rechargeable batteries, power supplies, and power inverters; secondary air conditioning/heating units 54; quad processors 56; infrared illuminators 58; night vision equipment 60; personnel equipment 62 such as porta-toilets and coolers; and other related equipment. Location and tracking equipment 64 such as GPS, satellite geotagging, lojack locators, license plate readers and the like may be integrated as part of the platform 30. A voice recorder 66 for surveillance personnel may be included to document surveillance and log radio transmissions tagged with time of day.

The vehicle 12 may be camouflaged to blend in with a particular neighborhood, for example, poor paint cover, dents, scratches and the like, as well as equipment such as aftermarket wheels and tires. Use of equipment on external surfaces such as solar panels may be camouflaged or designed to resemble original equipment manufactured design and installation. Window tinting or darkening to render portions of windows opaque may be used, for example, the window 14 illustrated in FIG. 5 may be painted black except in the area of position 32 of the camera 20 that may be tinted. Curtains, shades or panels may be used in a vehicle 12 to resemble installations used by the general public as vehicle owners.

While the invention has been particularly shown and described with respect to the illustrated embodiments thereof, it will be understood by those skilled in the art that the foregoing and other changes in form and details may be made therein without departing from the spirit and scope of the invention.

I claim:

1. A system for visual and sound surveillance using land vehicles comprising:
   a land vehicle with a plurality of cameras that are small profile pan-tilt-zoom cameras attached to a roof interior to said land vehicle adjacent to a passenger side front and rear corner, adjacent to a driver side position behind a driver seat location, and adjacent to a driver side rear corner;
   said plurality of cameras have a reduced subtending length below said roof inside over head structure sufficient to allow camera field of view external to said land vehicle through a transparent portion of said land vehicle at an attachment position and to minimize detection by a person external to said land vehicle;
   a platform with a controller in communication with said plurality of cameras, and a display, a keyboard and a camera position control device; and
   a recorder.

2. The system as in claim 1 wherein said plurality of cameras have good resolution and large zoom magnification characteristic packaged in a dome cover.

3. The system as in claim 1 wherein said subtending length is less than 1 to 2 inches below said roof inside overhead structure.

4. The system as in claim 1 wherein a portable control and communication device is in communication with a communication interface of said controller and said portable control is operable for remote control of said platform and said plurality of cameras.

5. The system as in claim 4 wherein said recorder is positionable with said portable control and communication device.

6. The system as in claim 4 wherein said communication is implemented using the World Wide Web.

7. The system as in claim 1 wherein said land vehicle has at least one of a supplemental electric power source, a supplemental air conditioning and heating unit, a personnel equipment unit and a voice recorder.

8. The system as in claim 1 wherein said land vehicle has a quad processor as a part of said platform.

9. The system as in claim 1 wherein said land vehicle has night vision equipment.

10. The system as in claim 1 wherein said land vehicle has an infrared illuminator.

11. The system as in claim 1 wherein said land vehicle has a position location device.

12. The system as in claim 11 wherein said position location device is a GPS tracking unit.

13. The system as in claim 1 wherein said land vehicle has tinted windows and window masking for reduced interior visibility from the outside of said land vehicle.

14. The system as in claim 1 wherein one of said plurality of cameras is attached to a generally vertical support member of said land vehicle.

* * * * *